United States Patent [19]

Moore et al.

[11] 3,781,724

[45] Dec. 25, 1973

[54] TERMINAL BLOCK

[75] Inventors: Leonard Moore; Ronald L. Bodle, both of Northridge, Calif.

[73] Assignee: Moore Industries Inc., Van Nuys, Calif.

[22] Filed: May 30, 1972

[21] Appl. No.: 257,779

[52] U.S. Cl. .................... 333/79, 339/147, 339/143

[51] Int. Cl. .................... H01h 7/14

[58] Field of Search .................... 333/79; 339/143, 339/147, 79

[56] References Cited

UNITED STATES PATENTS

| | | | |
|---|---|---|---|
| 3,435,387 | 3/1969 | Reinke et al. | 333/79 |
| 3,275,953 | 9/1966 | Coda et al. | 333/79 |
| 3,573,677 | 4/1971 | Detar | 333/79 |
| 3,663,929 | 5/1972 | Bulter et al. | 333/79 |
| 3,535,676 | 10/1970 | Schultz, Sr. | 333/79 |
| 3,579,155 | 5/1971 | Mills | 333/79 |
| 3,588,758 | 6/1971 | Hurst | 333/79 |

*Primary Examiner*—Rudolph V. Rolinec
*Assistant Examiner*—Saxfield Chatmon, Jr.
*Attorney*—Julius L. Rubinstein

[57] ABSTRACT

The invention is characterized by a terminal block formed in part from insulating material. The terminal block is designed to be attached to a housing surrounding electronic equipment which is affected by radio frequency signals. The terminal block is provided with connector pins which extend through the bores of tubular rf filters. These filters are designed to block the entry of rf signals to the interior of the housing and to short out the rf signals to a ground plane which is also a part of the terminal block. The ground plane is electrically connected to the housing and to the rf filters at a point intermediate their ends. In addition, adjustment are provided to control the penetration of the pins and filters on the terminal block inside the housing.

18 Claims, 5 Drawing Figures

TERMINAL BLOCK

This invention relates generally to a terminal block and more particularly to a terminal block for electronic equipment wherein the terminal block includes radio frequency (rf) filters for preventing the entry of rf signals to the electronic equipment through the terminal block.

BRIEF SUMMARY AND BACKGROUND

In recent years the development of small and compact radio transmitters and receivers has found wide use for communication purposes in manufacturing plants, hospitals, and the like. However, modern electronic equipment is often sensitive to rf signals and their operation can be adversely affected thereby. Consequently, the introduction of rf signals from radio transmitters or other equipment in manufacturing plants and hospitals has affected the operation of the electronic equipment and has created problems which were not anticipated when the electronic equipment was originally installed.

Electronic equipment can be quite expensive, and it is desirable to provide some means for quickly and inexpensively modifying rf sensitive equipment in a way that does not require its replacement or an extensive redesign.

Typically, electronic equipment utilizes terminal blocks formed from some insulating material, and connector wires or pins extend through the terminal block to the interior of the housing for attachment to the electronic equipment there. Heretofore, the connector pins which extended through the terminal block provided a path for the rf signals to the interior of the housing.

The theoretical aspects of designing rf filters for these connector wires or pins is in itself not particularly complex. However, the problem applicant has concerned himself with is providing an entire terminal block which has built-in rf filters and which can be quickly and easily attached to electronic equipment to replace the existing terminal block.

Furthermore, just as it is undesirable to admit the entry of rf signals to the interior of a housing surrounding rf sensitive electronic equipment, it is also undesirable to permit the escape of rf signals from some kinds of equipment. For example, television equipment and other circuits utilizing ultra high frequencies, such as radar and navigational aids, could induce high frequency currents in circuit leads, which could produce undesirable radations.

Applicant has solved this problem, along with the problem above described, by providing his terminal blocks with connector pins which extend through the insulated material. Screws are attached to the outer ends of the pins for electrical connection to input or output wires, while the opposite end of the pins are designed to be electrically connected to equipment inside the housing. These pins extend through tubular rf filters, and the rf filters are electrically connected to a ground plane which is electrically connected to the housing. In this way, by simply replacing the prior terminal block with a terminal block constructed according to the principles of this invention, applicant has provided means for quickly and economically retrofitting existing electronic equipment.

What is needed, therefore, and comprises an important object of this invention, is to provide a terminal block having means thereon for preventing the passage of rf signals through the terminal block to the interior of a housing surrounding rf sensitive electronic equipment.

Another object of this invention is to provide a terminal block for electrical equipment wherein the connectors on the terminal block extend through tubular bores of rf filters and are electrically connected thereto, while the outer surface of the tubular filters are electrically and mechanically connected to a ground plane at points intermediate the ends of the filters.

These and other objects of this invention will become more apparent and better understood in the light of the accompanying specification and drawings wherein.

Figures 1, 2, 3, 4:
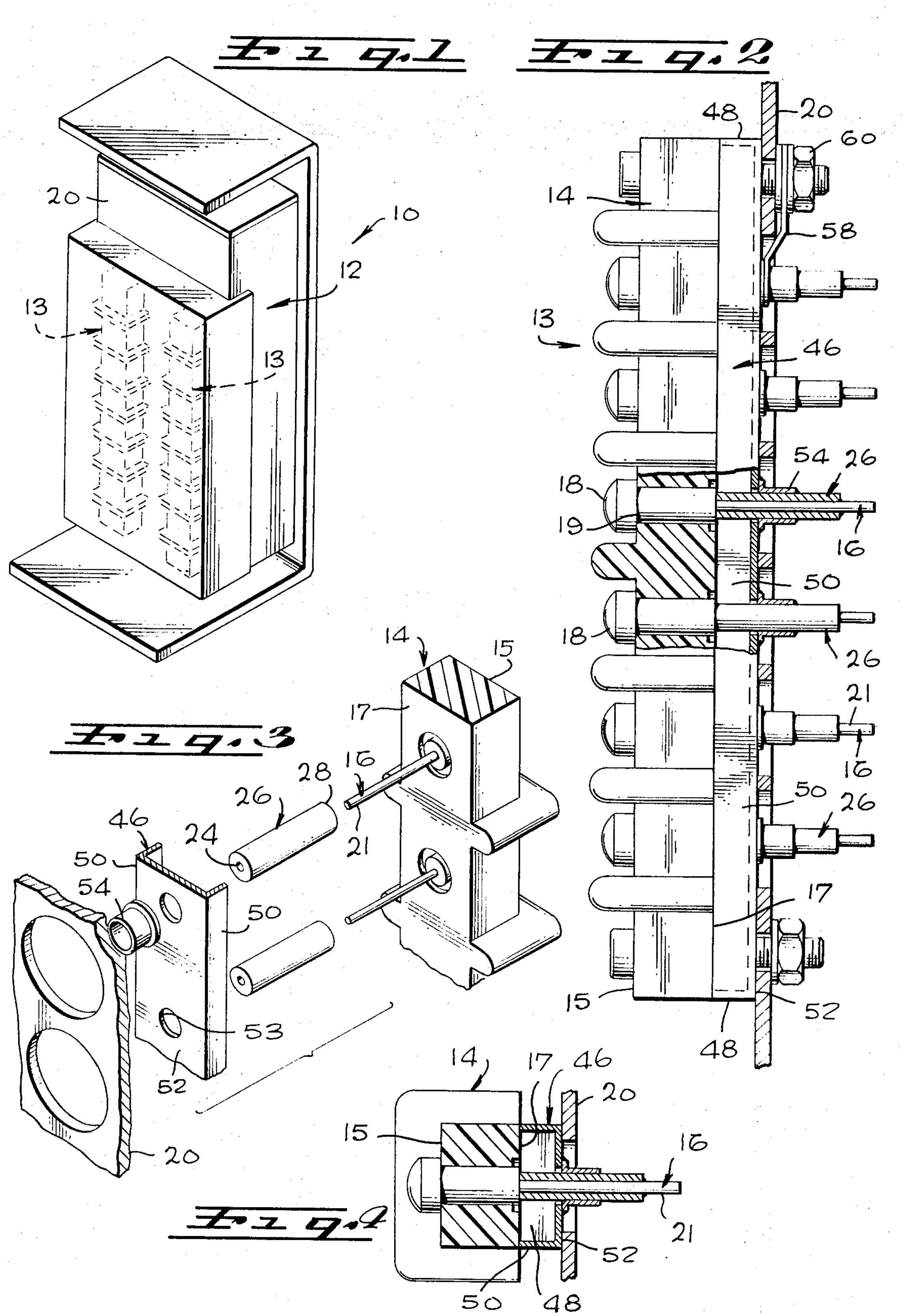
FIG. 1 is a perspective view of a housing for electrical equipment showing terminal blocks attached thereto.
FIG. 2 is a side view partly in section showing the construction of the terminal block and the connection between the electrical pins extending through the tubular rf filters and the ground plane.
FIG. 3 is an exploded perspective view showing the parts of the terminal block constructed according to the principles of this invention.
FIG. 4 is an end elevational view of a terminal block partly in section constructed according to the principles of this invention.

Referring now to FIG. 1 of the drawing, electrical equipment sensitive to the presence of rf signals indicated generally by the reference numeral 10, comprises a housing 12 usually formed from a conductive metal or some material impervious to rf signals. One or more linearly extending terminal blocks 13 are secured to a wall 20 of the housing. The terminal blocks include an insulator support structure 14 preferably formed from a plastic material which is electrically and magnetically inert. The support structure 14 includes outer and inner sides 15 and 17.

As seen in FIGS. 2, 3 and 4, the insulator support structure 14 is provided with electrically conductive metallic pins 16. The pins include a first portion 19 and a second portion 21. The first portion of the pins is embedded in the insulator support structure 14 extending from the outer side 15 of the insulator support structure to the inner side 17, see FIG. 5. The second portion 21 of the pins is in this particular embodiment, reduced in diameter and projects inwardly from the inner side 17 of the insulator support structure. The end of the first portion 19 is connected to electrical screws 18 and the second portion 21 is designed to extend inside the housing 12 for electrical connection to the equipment inside the housing.

Figure 5:
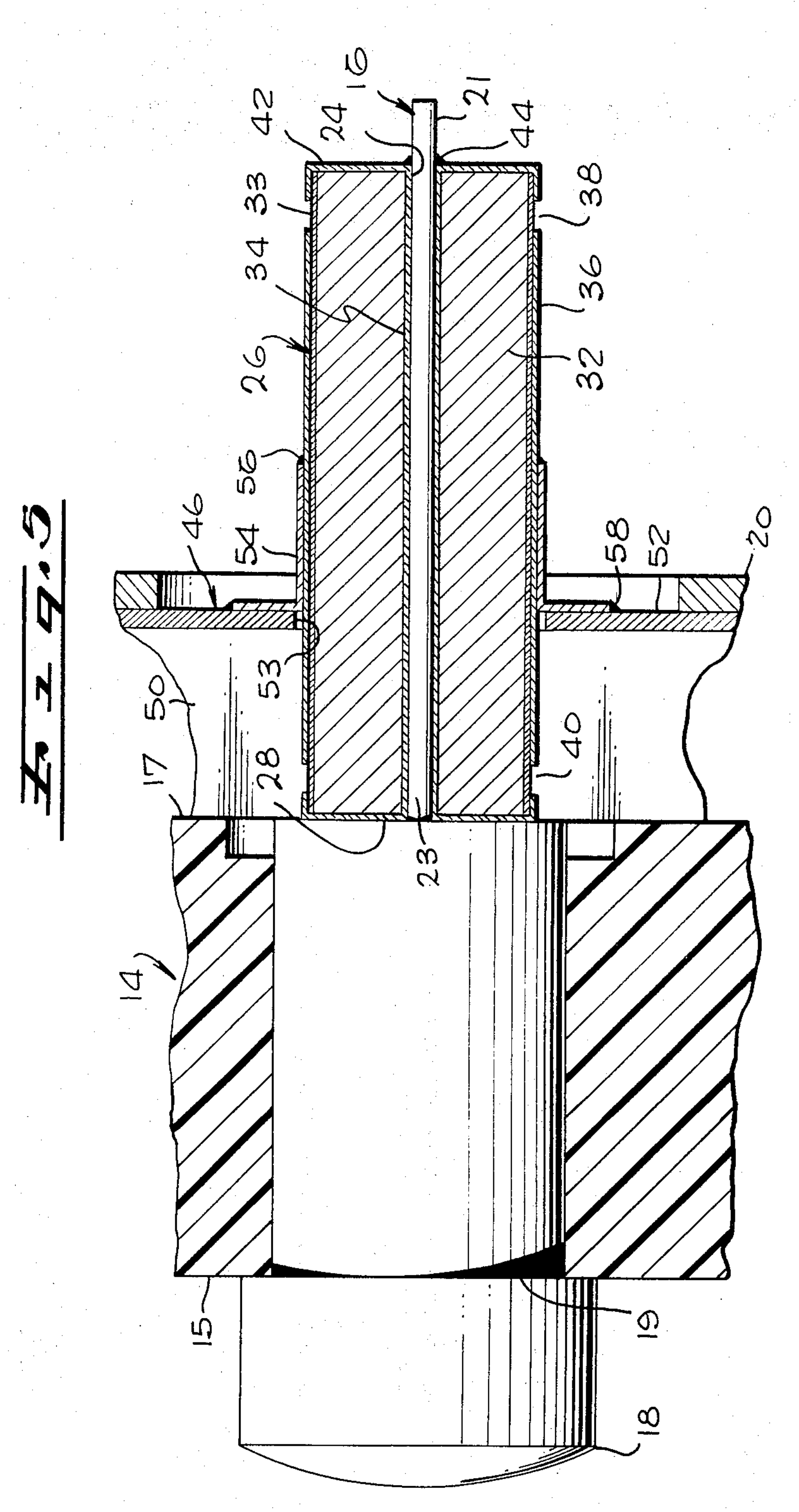
FIG. 5 is an enlarged elevational view showing details of the terminal block along with their mode of assembly.

As best seen in FIG. 5 the second portion 21 of the pins 16 extend through the bores 24 of tubular rf filters 26. The filters are designed so one end 28 abuts against a surface near the inner side or surface 17 of the insulator support structure 14. In the particular embodiment show, the pins 16 are reduced in diameter at (23) to provide an abutment surface against which end portion 28 of filter 26 abuts.

The rf filter itself is tubular and is formed from a ferrite material 32. A titanate coating 33 is applied directly to the outer surface of the ferrite sleeve 32 as shown in FIG. 5 in order to provide higher physical strength or higher capacitance. A thin plating of gold 34 or other suitable material is formed on the inner bore of the rf filter and over the titanate coating 33 on its outer surface 36, serving as inner and outer electrodes at 44 and 56, as shown. The thin plating of gold extends from the bore to the outer surface of the filter, but there is a separation between portions of the plating on the outer surface of the rf filter defined by insulating gaps 38 and 40 as shown.

The pin 16 is in electrical contact along its length with the interior of the gold plating in the bore, but to insure a more perfect electrical contact, the pin is soldered to the inner end 42 of the electrode 44, as shown, to provide both an electrical and mechanical connection between the filter 26 and the pin 16. In this way the tubular filters 26 are separably supported on the second portion 21 of the pins and the entire rf filter projects inwardly from the inner surface 17 of the insulator support structure 14, see FIGS. 2 and 5.

Since there are usually a number of electrical connections extending through the terminal block which could provide an entry for rf signals to the interior of the housing 12, a ground plate or structure 46 is provided. This ground plate is preferably formed from an electrically conductive sheet metal and is generally channel shaped in cross section and includes both flanged end and side walls 48 and 50 and a planar conductive surface 52 for reasons to be described below. The end and side walls 48 and 50 have a plurality of functions, in that they serve to space the insulator support structure 14 away from wall 20 of the housing 12 to control the distance the connector pins 16 and rf filters 26 projects inwardly beyond the planar ground surface 52 and housing wall 20. See FIG. 4. The planar conductive surface 52 is provided with openings 53 for receiving the outer surface of the tubular filters 26. The openings 53 are substantially larger in diameter than the diameter of the tubular rf filters 26, see FIGS. 4 and 5. This arrangement is important because the holes 53 can be stamped in the conductive surface 52 without great precision, and all the filters 26 attached to the insulator support structure 14 will still be in adequate alignment with the openings 53, thus decreasing manufacturing costs. Furthermore, with the spacing between holes 53 and the surface of filter 26, as great as it is, the ground plates 46 can be easily removed and replaced on the insulator support structure and all the assembled filters 26 will easily fit through the adjacent openings 53 in the ground plate. In addition, when the ground plate 46 is removed, all the filters 26 projecting from the inner surface 17 are completely exposed for visual inspection and for easy removal and replacement.

A ferrule 54 is mounted on the ground plane surface 52 surrounding openings 53 and is soldered to the gold plating or electrode on the outer surface of the filter at 56 at a point intermediate the ends of the filters. The ferrule is also soldered to the ground plane at 58 for a better electrical connection. The spacing between the ground plane surface 52 and the end 28 of the rf filter 26 is important because when the connector pin 16 is soldered at 44 to end 42 of the rf filter, capillary action might draw solder at the inner end 42 of the filter through the bore of the filter to the end 28 where except for the spacing between the ground plane surface 52 and the end 28 of the filter, the filter could be shorted out.

In this way, when the electronic equipment is retrofitted with the terminal block constructed according to the principles of this invention, no part of the equipment inside of the housing will have to be moved or adjusted. In addition, the end and side walls 48 and 50 surround the connector pins 16 and rf filters 26 to prevent harmful material from the factory or plant or hospital from entering the region between the inner side 17 of the insulator support structure 14 and the planar conductor surface 52 which might affect or short out the rf filters. However, their most important function is that they keep the ground plane surface 52 in spaced relation from the ends of the filters 26.

The operation of the rf filter is as follows: the ferrite material 32 functions as an inductance and impedes the rf signal from moving along the pin 16 to the interior of the housing. In addition, the spacing between the gold plating 34 in bore 24 and the gold plating 36 on the outer surface of the titanate coating 33 of the filter provides a capacitive function, and if the dimensions are properly chosen the electrical connection between the pin 16 in the bore 24 of the rf filter 26 and the ground plane surface 52 and surface 36 shorts out the rf signals to the ground plane surface 52.

As best seen in FIG. 2, the ground plate structure 46 is electrically connected to the metallic housing 12 by means of lug 58 which is electrically connected to a ferrule 54 and to a connecting lug screw 60. In this way, the rf signals are shunted to the housing, and the housing itself must be grounded to complete the path for the rf signals to ground.

With this arrangement, when existing equipment needs to be retrofitted because problems have arisen involving the presence of rf signals, it is only necessary to replace the existing terminal block with a terminal block constructed according to the principles of this invention, and with the length of the side and end walls of the ground plane properly selected.

Since it is necessary to control the projection of the end of pin 16 and the rf filters 26 inside the housing 12 beyond wall 20 so that the electrical parts inside housing 12 don't have to be moved when the terminal block is replaced with a terminal block constructed according to the principles of this invention, means may be provided to provide a variation in this length. Adjustment means in the form of shims could be mounted which would be placed between the end and side walls 48 and 50 of the channel shaped ground plate structure and the inner side 17 of the insulator support structure to provide the length variation required.

Although to this point the invention has been described in terms of providing a simple and economical means for retrofitting existing electronic equipment and giving them a capacity to prevent the entry of rf signals to the electronic equipment, it is of course understood, and it is contemplated that the terminal blocks described could be installed as original equipment.

In addition, although the principles of this invention has been shown and described as providing a means for preventing the entry of electronic equipment to the interior of a housing surround rf sensitive electronic equipment, the terminal block constructed according to the principles of this invention could also be used to prevent the exit of high rf or ultra high frequency signals from electronic equipment inside the housing and thus confine the radiations so they are not permitted to stray and cause interference with other apparatus.

Having described the invention, what are claimed as new, is:

1. A terminal block of the class described comprising an insulator support structure which is electrically and magnetically inert, and having inner and outer sides, a plurality of electrically conductive connector pins attached to the insulator support structure, said connector pins having a first portion extending from the outer side of the insulator support structure to the inner side and a second portion projecting inwardly from the inner side of the insulator support structure, the first portion of the connector pins adjacent the outer side of the insulator support structure adapted to be associated with connector screws for providing electrical wiring to the connector pins, a tubular rf filter for each pin, each rf filter including an electrode in its bore and an electrode on its outer surface, the second portion of said connector pins extending through the bore of the tubular filters and electrically and mechanically connected to the electrode in its bore, but separable therefrom and in such a way that the rf filters are supported on the second portion of the pins and each entire rf filter projects inwardly from the inner surface of the insulator support structure, a ground plate, said ground plate including portions abutting the inner side of the insulator support structure and including conductive portions in inwardly spaced relation to said inner side, said inwardly spaced conductive portions having openings sized to permit the tubular filters to extend therethrough, and means for electrically and mechanically attaching the electrode on the outer surface of each tubular rf filter to said spaced conductive portion of the ground plate whereby each filter is supported on the second portion of the connector pins and intermediate its ends on the ground plate.

2. The terminal block described in claim 1 wherein each tubular filter is formed from a ferrite material, the bore and outer surface of each ferrite tube coated with a metallic conductor so that the bore and the outer surface are spaced conductive surfaces to provide a capacitive function to short out the rf signals to the ground plate while the ferrite material functions as an inductance to impede the rf signals from moving through the connector pins.

3. The terminal block described in claim 2 wherein the bore and outer surface of each rf filter are coated with gold.

4. The terminal block described in claim 1 wherein the ground plate includes wall portions, at least part of the wall portions abutting against the inner side of the insulator support structure.

5. The terminal block described in claim 4 wherein the wall portions surround the tubular filters and connector pins and prevent the entry of foreign material in the region between the inner side of the insulator support structure and the conductive portion of the ground plate and serve as spacing means to control the distance the connector pins and tubular filters extend beyond the ground plate.

6. A terminal block of the class described comprising an insulator support structure having inner and outer sides and formed from an insulating material which is electrically and magnetically inert, a plurality of electrically conductive connector pins attached to the insulator support structure, said connector pins having a first portion extending from the outer side insulator support structure to the inner side and a second portion projecting inwardly from the inner side of the insulator support structure, the first portion of the connector pins adjacent the outer side of the insulator support structure adapted to be associated with connector screws for providing an electrical connection to the connector pins, a tubular rf filter for each pin, each rf filter including an electrode in its bore and an electrode on its outer surface, the second portion of said connector pins extending through the bore of the tubular filters and electrically and mechanically connected to the electrode in its bore but separable therefrom with the rf filters supported on the second portion of the pins and in such a way that the entire body of each rf filter projects inwardly from the inner surface of the insulator support structure and in such a way that one end of each tubular filter abuts against a surface near the inner side of the insulator support structure, while a portion of each projector pin projects out beyond the opposite end of each tubular filter, a ground plate formed from a metallic sheet material and including integral flanged wall portions and a planar conductive surface, said flanged wall portions abutting the inner side of the insulator support structure and supporting said planar conductive surface in spaced relation to the inner side of the insulator support structure, said planar conductive surface having openings sized to permit the tubular filter to extend therethrough, and means for electrically and mechanically attaching the electrode on the outer surface of each filter to said spaced conductive portion of the ground plate whereby each filter is supported on the second portion of the connector pins and intermediate its ends on the ground plate.

7. The terminal block described in claim 6 wherein the wall portions serve as spacers for controlling the distance the connector pins and tubular filters project beyond said planar conductive surface.

8. The terminal block described in claim 7 wherein the wall portions surround said connector pins and tubular filters to prevent the entry of foreign matter in the region between the inner side of the insulator support structure and the planar conductive surface.

9. The terminal block described in claim 8 including means for adjusting the spacing between the planar conductive surface and the inner side of the insulator support structure in order to vary the distance the connector pins and tubular filters project beyond said planar conductive surface.

10. The terminal block described in claim 6 wherein each tubular filter is formed from a ferrite material, and the bore and outer surface of each ferrite tube is coated with a metallic conductor so that the bore and outer surface of the ferrite material provide a capacitive function to short out the rf signals to the ground plate, while the ferrite material functions as an inductance to impede the rf signals from moving the connector pins.

11. The apparatus described in claim 10 wherein the bore and outer surface of each tubular filter is coated with gold.

12. A terminal block of the class described comprising a linearly extending insulator support structure formed from a plastic material and having inner and outer sides, a plurality of electrically conductive connector pins embedded in the insulator support structure and disposed in spaced parallel relationship to each other, said connector pins having a first portion extending from the outer side of the insulator support structure to the inner side and a second portion projecting inwardly from the inner side of the insulator support structure, the first portion of the connector pins adjacent the outer side of the insulator support structure adapted to be connected to connector screws for providing an electrical connection thereto, a tubular rf filter for each pin, each rf filter including an electrode in its bore and an electrode on its outer surface, the second portion of said connector pins extending through the bores of the tubular rf filters and electrically and mechanically connected to the electrode in its bore but separable therefrom with the rf filters supported on the second portions of the pin and the entire body of each rf filter projecting inwardly from the inner surface of the insulator support structure, and in such a way that one end of each tubular filter abuts against a surface near the inner side of the insulator support structure while a portion of the connector pins projects out beyond the opposite end of each tubular filter, a linearly extending ground plate formed from a conductive metallic sheet material and including flanged end and side walls and a planar conductive surface, said flanged end and side walls abutting the inner side of the insulator support structure to support the planar conductive surface in spaced relation to the inner side of the insulator support structure, said planar conductive surface having openings sized to permit the tubular filters to extend therethrough, and means for electrically and mechanically attaching the electrode on the outer surface of each filter to said planar conductive surface whereby each filter is supported on the second portion of the connector pins and intermediate its end on the planar conductive surface, said side and end walls serving as spacers for controlling the distance the connector pins and tubular filters project beyond said planar conductive surface, and surrounding said connector pins and rf filters to prevent the entry of foreign matter in the region between the inner side of the insulator support structure and the planar conductive surface.

13. The terminal block described in claim 12 wherein each tubular filter is formed from a ferrite material, the bore and outer surface of each ferrite material coated with a metallic conductor so that the bore and outer surface provide a capacitive function to short out the rf signals to the ground plate, while the ferrite material functions as an inductance to im-pede the rf signals from moving through the connector pins.

14. The terminal block described in claim 13 wherein the bore and outer surface of each terminal block are plated with gold.

15. A terminal block of the class described comprising an insulator support which is electrically and magnetically inert, and having inner and outer sides, a plurality of electrically conductive connector pins attached to the insulator support structure, said connector pins having a first portion extending from the outer side of the insulator support structure to the inner side and a second portion projecting inwardly from the inner side of the insulator support structure, the first portion of the connector pins adjacent the outer side of the insulator support structure adapted to be associated with connector screws for providing electrical wiring to the connector pins, a tubular rf filter for each pin, each rf filter including an electrode in its bore and an electrode on its outer surface, the second portion of said connector pins extending through the bore of the tubular filters and electrically and mechanically connected to the electrode in its bore but separable therefrom whereby the rf filters are supported on the second portions of the pins and the entire body of each rf filter projects inwardly beyond the inner surface of the insulator support structure, a ground plate, said ground plate including portions abutting the inner side of the insulator support structure and including conductive portions in inwardly spaced relation to said inner side, said inwardly spaced conductive portions having openings substantially larger than the diameter of the tubular filters to permit the tubular filters to freely extend therethrough, and means for electrically and mechanically attaching the electrode on the outer surface of each filter to said inwardly spaced conductive portion of the ground plate whereby each filter is supported on the second portion of the connector pins and intermediate its ends on the ground plate.

16. The terminal block described in claim 15 wherein said means for electrically and mechanically attaching the electrode on the outer surface of each filter to the outwardly spaced conductive portion of the ground plate comprises a ferrule, said ferrule electrically and mechanically connected to the electrode on the outer surface of each filter and to inwardly spaced conductive portion of the ground plate.

17. A terminal block of the class described comprising an insulator support structure which is electrically and magnetically inert, and having inner and outer sides, a plurality of electrically conductive connector pins attached to the insulator support structure, said connector pins having a first portion extending from the outer side of the insulator support structure, and a second portion projecting inwardly from an inner side of the insulator support structure, the first portion of the connector pins adjacent the outer side of the insulator support structure adapted to be associated with connector screws for providing electrical wiring to the connector pins, a tubular filter for each pin, each rf filter including an electrode in its bore and an electrode on its outer surface, the second portion of said connector pins extending through the bore of the tubular filters and electrically connected to the electrode in its bore, a ground plate, said ground plate including portions abutting an inner side of the insulator support structure and including conductive portions in inwardly spaced relation to said inner side, said inwardly spaced conductive portions having openings sized to permit the tubular filter to extend therethrough, said openings substantially larger than the diameter of the tubular filters so the tubular filters on the second portion of the connector pins will be in sufficient alignment with said openings so the array of tubular filters on the second portions of the connector pins can all pass therethrough, and means for electrically and mechanically attaching the electrode on the outer surface of each filter to said inwardly spaced conductive portion of the ground plate whereby each filter is supported intermediate its ends on the ground plate.

18. The terminal block described in claim 17 wherein said means for electrically and mechanically attaching the electrode on the outer surface of each filter to said inwardly spaced conductive portion of the ground plate comprises a ferrule, said ferrule sized to fit over the outer surface of each filter and to cover said enlarged opening in the ground plate; and means for electrically and mechanically attaching said ferrule to said electrode on the outer surface of said filter and to said ground plate.

* * * * *